United States Patent [19]

Sutt, Jr.

[11] Patent Number: 4,629,476
[45] Date of Patent: Dec. 16, 1986

[54] CARBON MOLECULAR SIEVES AND A PROCESS FOR THEIR PREPARATION AND USE

[75] Inventor: Robert F. Sutt, Jr., Coraopolis, Pa.

[73] Assignee: Calgon Carbon Corporation, Pittsburgh, Pa.

[21] Appl. No.: 709,265

[22] Filed: Mar. 7, 1985

Related U.S. Application Data

[62] Division of Ser. No. 475,796, Mar. 16, 1983, Pat. No. 4,528,281.

[51] Int. Cl.$^4$ .............................................. B01D 53/04
[52] U.S. Cl. ............................................ 55/68; 55/74
[58] Field of Search ..................... 55/68, 74, 75, 387, 55/389

[56] References Cited

U.S. PATENT DOCUMENTS

| | | | |
|---|---|---|---|
| 3,536,521 | 10/1970 | McKinney et al. | 55/75 X |
| 3,658,696 | 4/1972 | Shively et al. | 55/75 X |
| 3,724,170 | 4/1973 | Allen et al. | 55/75 X |
| 3,960,522 | 6/1976 | Munzner et al. | 55/68 |
| 3,962,129 | 6/1976 | Munzner et al. | 55/75 X |
| 4,046,709 | 9/1977 | Yuki | 55/68 X |
| 4,261,709 | 4/1981 | Itoga et al. | 55/75 X |
| 4,414,005 | 11/1983 | DeBievre et al. | 55/75 |
| 4,420,415 | 12/1983 | Yuki et al. | 55/68 X |
| 4,490,160 | 12/1984 | Yuki et al. | 55/68 |
| 4,528,281 | 7/1985 | Sutt, Jr. | 55/75 X |

FOREIGN PATENT DOCUMENTS 2045200 3/1972 Fed. Rep. of Germany .......... 55/75

*Primary Examiner*—Robert Spitzer
*Attorney, Agent, or Firm*—Reed Smith Shaw & McClay

[57] ABSTRACT

A process for separating mixtures containing components of at least two different molecular diameters, molecular weights or molecular shapes by passage of such mixture through a carbonaceous molecular sieve substrate which is selected from carbon sieves, calcined char and calcined agglomerated char such as coconut, peach pits, walnut shells, babassu nut shells and cherry pits, oxidized and devolatized agglomerated coal and calcined agglomerated coal impregnated with an organic polymer having a molecular weight of at least 400 or an inorganic polymer.

14 Claims, 1 Drawing Figure

CARBON MOLECULAR SIEVES AND A PROCESS FOR THEIR PREPARATION AND USE

This is a division of application Ser. No. 475,796, filed Mar. 16, 1983, now U.S. Pat. No. 4,528,281.

BACKGROUND OF THE INVENTION

This invention is directed to molecular sieves and a process for their preparation and use. More particularly, this invention is directed to carbonaceous molecular sieves, having high selectivity ratios and high capacity values. The molecular sieves of this invention are produced by the impregnation of carbonaceous substrates with an organic polymer having a molecular weight of at least 400, as determined by vapor phase osmometry, or with an inorganic polymer.

Munzner et al., U.S. Pat. No. 3,962,129, describes a carbon molecular sieve produced by impregnating a porous coke with a low molecular weight organic compound having a boiling point of from 200°-550° C. as measured at atmospheric pressure. (See Column 2, lines 50-57). This impregnation technique effectively reduces the substrate micropores to between 2 to 6 Angstroms, but generates a sieve with reduced capacity.

Carbon molecular sieves have been prepared by externally coating granular activated carbon with from about 20 to 50 weight percent of a partially polymerized solution followed by curing of the polymer and carbonization (charring) of the polymer coating. See: P. L. Walker, Jr., et al., *Conference on Industrial Carbon and Graphite, Proceedings (London)* 1965, "The Preparation of 4 Å and 5 Å Carbon Molecular Sieves".

Addison, U.S. Pat. No. 2,761,822, describes a finishing process for activated carbon. This process improves the adsorption selectivity, but reduces the internal capacity of the carbon substrate.

It has been discovered that the macropore structure of carbonaceous substrates may be blocked by impregnation with an organic or inorganic polymer. This polymeric block acts to limit access through the macropore structure of the substrate without significantly affecting either the micropore capacity or the microporous diffusion characteristics of the substrate. Thus, selectivity of the substrate is improved without a substantial loss of substrate capacity.

SUMMARY OF THE INVENTION

Figure 1:
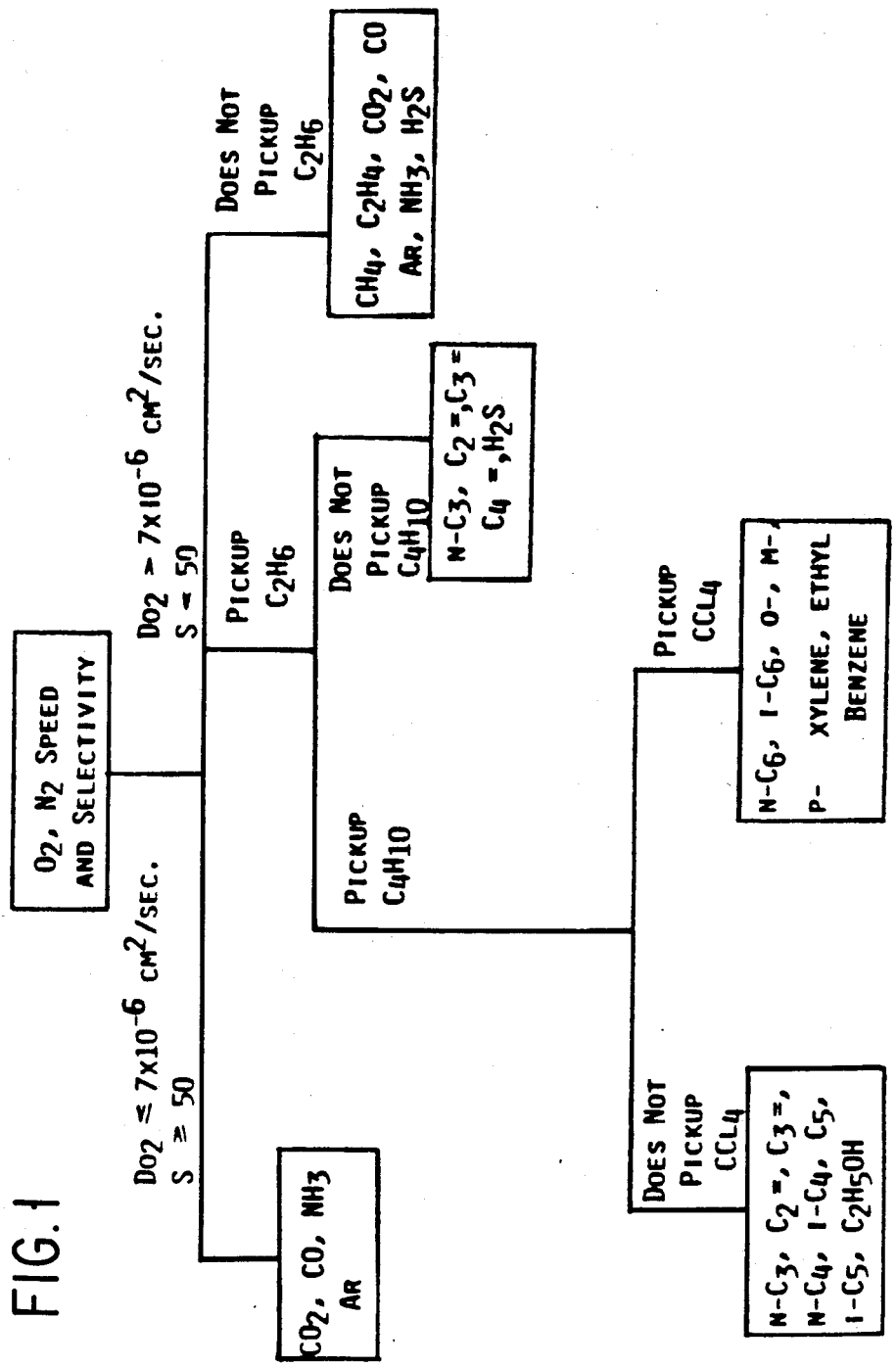
FIG. 1 is a flow chart indicating the separation characteristics of small and medium sized gases, based upon molecular sieve oxygen and nitrogen diffusivities (speed) and oxygen/nitrogen selectivity ratios in the adsorption of various model compounds.

The instant invention is directed to a molecular sieve comprising a carbonaceous substrate impregnated with an organic polymer having a molecular weight of at least 400, as determined by vapor phase osmometry, or with an inorganic polymer at a dosage of at least 0.001 weight percent (based on the substrate weight) up to a maximum dosage which still allows the resulting sieve to separate gas or liquid mixtures containing components of at least two different molecular diameters, molecular weights or molecular shapes.

The instant invention is also directed to a process for preparing a molecular sieve which comprises impregnating a carbonaceous substrate with an organic polymer having a molecular weight of at least 400, as determined by vapor phase osmometry, or with an inorganic polymer at a dosage of at least 0.001 weight percent (based on the substrate weight) up to a maximum dosage which still allows the resulting sieve to separate gas or liquid mixtures containing components of at least two different molecular diameters, molecular weights or molecular shapes.

The instant invention is also directed to a process for separating gas or liquid mixtures containing components of at least two different molecular diameters, molecular weights or molecular shapes, comprising passing the liquid or gas through a molecular sieve comprising a carbonaceous substrate impregnated with an organic polymer having a molecular weight of at least 400, as determined by vapor phase osmometry, or with an inorganic polymer at a dosage of at least 0.001 weight percent (based on the substrate weight) up to a maximum dosage which still allows the resulting sieve to separate gas or liquid mixtures containing components of at least two different molecular diameters, molecular weights or molecular shapes.

DETAILED DESCRIPTION

As used herein, the term "carbonaceous substrate" refers to a porous material consisting mostly of carbon, having a medium to large internal surface, and which, due to its internal surface properties, adsorbs gaseous and/or liquid compounds. Carbonaceous substrates include activated carbons, carbon molecular sieves, chars, hard and soft coals, bituminous coals, anthracite coals, lignite coals, brown coals, peat, coconut shells, charred peach pits, walnut shells, babassu nut shells, charred cherry pits, wood and the like. Several of these carbonaceous substrates may be advantageously pretreated before impregnation. Typical pretreatment steps to increase the porous nature of the substrate would include calcination to form a sieve-like substrate or activation to form an activated carbon substrate.

The preparation of carbon molecular sieves is described in U.S. Pat. Nos. 3,884,830, 3,222,412, 3,801,513, 2,556,859, 4,046,709 and others.

Typical methods for preparing activated carbons are described in J. W. Hassler's "Active Carbon", chapter 2, pages 12-35, Chemical Publishing Co., Brooklyn, N.Y. (1951).

Molecular sieves may be prepared by employing a relatively large polymer to partially block the macropore structure of a carbonaceous substrate. This "block" limits the rate of diffusion of molecular gas or liquid species into and out of the substrate macropores, thus aiding the natural microporous sieving ability of the substrate thereby improving selectivity without significantly adversely affecting capacity.

To be useful as substrates herein, the pore structures of the carbonaceous substrates generally consist of a range of pore sizes including:

a. macropores generally >100 Angstroms diameter
b. micropores generally >100 Angstroms diameter By employing a polymer of sufficient molecular weight, and therefore sufficient molecular diameter, only macropores in the substrate will be blocked upon impregnation of the substrate by the polymer. An essential feature of the present invention is that the micropores of the substrate are not significantly affected by the polymer. This assures retention of both internal capacity and natural micropore sieving ability.

The sieve character of the substrate is improved by impregnation with an organic or inorganic polymer. The amount of polymeric impregnant used to block the substrate macropores will vary with the gas selectivities desired. In general, it is anticipated that at least 0.001 weight percent of polymer will suffice. If too high a dosage of polymer is used, the micropores can become blocked, causing the impregnated substrate to lose its intended sieving properties. The maximum dosage will depend on the substrate used. The optimal dosage may be determined by varying the dosage and identifying the impregnated sieve with the optimal sieving properties. Generally, over 20 weight percent will cause over-blocking; however, even less impregnant will cause over-blocking with some substrates.

To be useful as an impregnant herein, the polymer selected should improve the selectivity ratio of the substrate without significantly adversely affecting the capacity of the substrate.

Selectivity is defined as the ratio of two diffusivity values (e.g. diffusivity of oxygen/diffusivity of nitrogen—$DO_2/DN_2$) and capacity is defined as the volume of adsorbate retained in a given volume of carbon molecular sieve. A high selectivity ratio means that the sieve readily discriminates between components of a mixture on the basis of molecular diameter, molecular shape, molecular velocity, and/or interaction with the solid surface. A high capacity value means that a small amount of sieve will adsorb a large volume of gas.

In general, it has been found that smaller, lighter molecules are adsorbed more rapidly by carbon molecular sieves than larger, heavier molecules. A typical listing of molecules in order of decreasing diffusivity into carbon molecular sieves is as follows: hydrogen, helium, oxygen, carbon monoxide, carbon dioxide, ammonia, nitrogen, argon, methane, hydrogen sulfide, ethylene, ethane, propylene, ethanol, propane, n-butane, isobutane, n-pentane, isopentane, o-xylene, m-xylene, p-xylene, n-hexane, 2-methyl pentane, n-heptane. This listing is not complete, but is meant merely as a rule of thumb. Some variation in the order of diffusivities should be expected, depending upon the specific adsorbent used. However, the adsorption rate differences due to molecular diameter, molecular shape, molecular velocity and/or adsorbate/adsorbent interactions serves as a basis for separating gaseous or liquid mixtures. The greater the difference in adsorption rate of the mixture components, the easier it is to separate the mixture. The terms "molecular diameter", "molecular velocity" and "adsorbate/adsorbent interactions" are well understood by those familiar with transport phenomena and adsorption theory. Nevertheless, the following works are hereby included for reference:

(1) R. B. Bird, W. E. Stewart and E. N. Lightfoot, *Transport Phenomena*, J. Wiley & Sons, New York (1960).

(2) J. O. Hirshfelder, C. F. Crentis and R. B. Bird, *Molecular Theory of Gases and Liquids*, J. Wiley & Sons, New York (1954).

(3) W. A. Steele, "The Interaction of Gases With Solid Surfaces", *The International Encyclopedia of Physical Chemistry and Chemical Physics*, Topic 14, Volume 3, Pergamon Press, Oxford (1974).

(4) A. W. Anderson, *Physical Chemistry of Surfaces*, John Wiley & Sons, New York (1976).

It is recognized that the absolute diffusivity of gases or liquids into solid adsorbents is difficult to ascertain experimentally. This is especially true of carbonaceous adsorbents which are structurally non-homogenous. For purposes of comparison, however, it is possible to select a reference adsorbent of a known size against which other adsorbents are relatively judged. Diffusivity values thus obtained will be useful in describing the adsorption of gases or liquids into a range of adsorbents. The carbon molecular sieves described herein were tested by observing the adsorption of various gases into previously evacuated samples at substantially one atmosphere pressure and substantially 25° C. Diffusivity values were then calculated using a simple equation which describes diffusion into a sphere:

$$L_t/L_e = 6(Dt/\pi R_0^2)^{\frac{1}{2}} - 3Dt/R_0^2$$

where
$L_t$ = test gas loading at time, t = 30 seconds
$L_e$ = equilibrium loading (usually at t = 1 hour)
D = diffusivity value
t = 30 seconds
$R_0$ = 0.05125 cm (the mean particle radius of a reference adsorbent)

It is understood that the choice of alternate parameters (e.g. another reference radius, temperature, pressure or time, t) would alter the absolute and relative magnitude of the diffusivity values thus obtained. This should not, however, be construed as limiting the breadth or validity of the invention described herein.

FIG. 1 represents a flow chart for selecting molecular sieves for specific gas separations. In this flow chart, the sieve sample is first analyzed for oxygen and nitrogen diffusivities (speed) as described herein above. From these two values, the oxygen/nitrogen selectivity ratio is calculated.

For light gases, e.g., oxygen, nitrogen, carbon monoxide, carbon dioxide and the like, generally useful values are diffusivities of at least $10 \times 10^{-8}$ cm$^2$/sec for at least one of the gases, preferably at least $200 \times 10^{-8}$ cm$^2$/sec, most preferably at least $500 \times 10^{-8}$ cm$^2$/sec, combined with selectivity ratios of at least 1.1, preferably at least 10, more preferably at least 25, most preferably at least 50. (A selectivity of at least 1.1 is the same as 0.9 or less. The ratio may be inverted.)

For heavy gases, e.g., ethane, propane, butanes and the like, diffusivity values should be at least $0.1 \times 10^{-8}$ cm$^2$/sec for at least one of the gases, preferably at least $25 \times 10^{-8}$ cm$^2$/sec, most preferably at least $100 \times 10^{-8}$ cm$^2$/sec, and selectivity ratios should be on the order of at least 1.1, preferably at least 5, more preferably at least 20, most preferably at least 50. (A selectivity of at least 1.1 is the same as 0.9 or less. The ratio may be inverted.)

The diffusivity of liquids can be lower than the minimums for gases.

Once the oxygen/nitrogen selectivity ratio has been calculated, and the oxygen speed ascertained, the flow chart is useful in deciding which particular gas separation will be most effective for the particular sieve in question.

Following the left arm of FIG. 1, if oxygen speed, ($DO_2$), is less than or equal to $7 \times 10^{-6}$ cm$^2$/sec with an oxygen/nitrogen selectivity ratio, $DO_2/DN_2$, (S), of greater than or equal to 50, the sieve may be useful for separating carbon monoxide, carbon dioxide, ammonia or argon.

Following the right arm of FIG. 1, if the oxygen speed is greater than $7 \times 10^{-6}$ cm$^2$/sec, or the oxygen/nitrogen selectivity ratio is less than 50, additional tests are required. If the sieve in question does not adsorb ethane, then it may be useful in separating methane, ethene, carbon monoxide, carbon dioxide, argon, ammonia or hydrogen sulfide. If the sample does adsorb ethane, additional tests are required to find the most efficient gas mixture situation for which the sieve may be employed.

It should be noted, that the flow chart of FIG. 1 is only a suggested guideline. The molecular sieves of the present invention are all useful for a variety of gas separations. The object of FIG. 1 is to determine preferred separation schemes.

At least 0.001 weight percent, preferably from 0.001 to 10.0, more preferably from about 0.001 to 5.0, most preferably 0.001 to 1.0, and with some separations, 0.001 to 0.5, weight percent of the polymer (based on the weight of the sieve) is sufficient to block the macropores to the extent necessary to improve oxygen/nitrogen selectivity, without affecting the internal micropores and therefore the capacity. Greater or lesser amounts of polymer may be employed for other gas separations.

Organic and inorganic polymers useful in the present invention are described in Sorenson and Campbell's "Preparative Methods of Polymer Chemistry", Interscience Publishers, Inc., New York, New York (1961) which is hereby incorporated by reference.

In general, the polymers useful herein fit into one or more of the following classes: polyamides, polyureas, polyurethanes, polyesters, other condensation polymers, addition polymers from unsaturated monomers, diene and triene polymers and copolymers, cyclic polyamides, cyclic poly esters, cyclic polyethers, silicone polymers, polymerized phosphonitrilic chloride, sulfur polymers, polymerized sulfur nitride, polyphenylene ethers, cross-linked polyesters, phenol formaldehyde resins, epoxy resin, and the like. See for example, "Inorganic Polymers", F. O. A. Stone and W. A. G. Graham, eds., Academic Press, New York (1962) and "Principles of Polymer Chemistry", P. J. Flory, Cornell University Press, Ithica, New York (1953) which are also herein incorporated by reference.

Examples of suitable monomers that may be used in making the polymers described above include: esters of acrylic and methacrylic acid such as methyl, ethyl, 2-chloro ethyl, propyl, isobutyl, isopropyl, butyl, tert-butyl, sec-butyl, ethylhexyl, amyl, hexyl, octyl, decyl, dodecyl, cyclohexyl, isobornyl, benzyl, phenyl, alkylphenyl, ethoxymethyl, ethoxyethyl, ethoxypropyl, propoxymethyl, propoxyethyl, propoxypropyl, ethoxyphenyl, ethoxybenzyl, ethoxycyclohexyl, hydroxyethyl, hydroxypropyl, ethylene, propylene, isobutylene, diisobutylene, styrene, ethylvinylbenzene, vinyltoluene, vinylbenzylchloride, vinyl chloride, vinyl acetate, vinylidene chloride, dicyclopentadiene, acrylonitrile, methacrylonitrile, acrylamide, methacrylamide, diacetone acrylamide, functional monomers such as vinylbenzene, sulfonic acid, vinyl esters, including vinyl acetate, vinyl propionate, vinyl butyrate, vinyl laurate, vinyl ketones including vinyl methyl ketone, vinyl ethyl ketone, vinyl isopropylketone, vinyl n-butyl ketone, vinyl hexyl ketone, vinyl octyl ketone, methyl isopropenyl ketone, vinyl aldehydes including acrolein, methacrolein, crotonaldehyde, vinyl ethers including vinyl methyl ether, vinyl ethyl ether, vinyl propyl ether, vinyl isobutyl ether, vinylidene compounds including vinylidene chloride bromide, or bromochloride, also the corresponding neutral or half-acid half-esters or free diacids of the unsaturated dicarboxylic acids including itaconic, citraconic, aconitic, fumaric, and maleic acids, substituted acrylamides, such as N-monoalkyl, N,N-dialkyl and N-dialkylaminoalkylacrylamides or methacrylamides where the alkyl groups may have from one to eighteen carbon atoms, such as methyl, ethyl, isopropyl, butyl, hexyl, cyclohexyl, octyl, dodecyl, hexadecyl and octadecyl aminoalkyl esters of acrylic or methacrylic acid, such as $\beta$-dimethylaminoethyl, $\beta$-diethylaminoethyl or 6-dimethylaminohexyl acrylates and methacrylates, alkylthioethyl methacrylates and acrylates such as ethylthioethyl methacrylate, vinylpyridines, such as 2-vinylpyridine, 4-vinylpyridine, 2-methyl-5-vinylpyridine; polymers and copolymers of thioethers and thiophenols; and the like.

In the case of copolymers containing ethylthioethyl methacrylate, the thio functional group can be oxidized to, if desired, the corresponding sulfoxide or sulfone.

Polyethylenically unsaturated monomers which ordinarily act as though they have only one such unsaturated group, such as isoprene, butadiene, and chloroprene, may be included as part of the monoethylenically unsaturated category.

Examples of polyethylenically unsaturated monomers include: divinylbenzene, divinylpyridine, divinylnaphthalenes, diallylphthalate, ethylene glycol diacrylate, ethylene glycol dimethacrylate, trimethylolpropanetrimethacrylate, divinylsulfone, polyvinyl or polyallyl ethers of glycol, of glycerol, of pentaerythritol, of diethyleneglycol, of monothio-derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, and triallyl phosphate. N,N'-methylene-diacrylamide, N,N'-methylene-dimethacrylamide, N,N'-ethylenediacrylamide, trivinylbenzene, trivinylnaphthalenes, and polyvinylanthracenes.

A preferred class of monomers of this type are aromatic ethylenically unsaturated molecules such as styrene, vinyl pyridine, vinyl naphthalene, vinyl toluene, phenyl acrylate, vinyl xylenes, and ethylvinylbenzene.

Examples of preferred polyethylenically unsaturated monomers include divinyl pyridine, divinyl naphthalene, divinylbenzene, trivinylbenzene, alkyldivinylbenzenes having from 1 to 4 alkyl groups of 1 to 2 carbon atoms substituted in the benzene nucleus, and alkyltrivinylbenzenes having 1 to 3 alkyl groups of 1 to 3 carbon atoms substituted in the benzene nucleus. Besides the homopolymers and copolymers of these poly(vinyl)benzene monomers, one or more of them may be copolymerized with up to 98 percent (by weight of the total monomer mixture) of (1) monoethylenically unsaturated monomers, or (2) polyethylenically unsaturated monomers other than the poly(vinyl)benzenes just defined, or (3) a mixture of (1) and (2). Examples of the alkyl-substituted di- and tri-vinyl-benzenes are the various vinyl-toluenes, the divinylethylbenzene, 1,4-divinyl-2,3,5,6-tetramethylbenzene, 1,3,5-trivinyl-2,4,6-trimethylbenzene, 1,4-divinyl, 2,3,6-triethyl-benzene, 1,2,4-trivinyl-3,5-diethylbenzene, and 1,3,5-trivinyl-2-methylbenzene.

Examples of suitable condensation monomers include: (a) aliphatic dibasic acids such as maleic acid, fumaric acid, itaconic acid, 1,1-cyclobutanedicarboxylic acid, etc.; (b) aliphatic diamines such as piperazine, 2-methylpiperazine, cis, cis-bis (4-aminocyclohexyl)methane, metaxylylenediamine, etc.; (c) glycols such as diethylene glycol, triethylene glycol, 1,2-butanediol, neopentyl glycol etc.; (d) bischloroformates such as cis and trans-1,4-cyclohexylbischloroformate, 2,2,2,4-tetramethyl-1,3-cyclobutyl bischloroformate and bischloroformates of other glycols mentioned above, etc.; (e) hydroxy acids such as salicylic acid, m- and p-hydroxybenzoic acid and lactones, derived therefrom such as the propiolactones, valerolactones, caprolactones, etc.; (f) diisocyantes such as cis and trans-cyclopropane-1,2-diisocyanate, cis and trans-cyclobutane-1,2-diisocyanate etc.; (g) aromatic diacids and their derivatives (the esters, anhydrides and acid chlorides) such as phthalic acid, phthalic anhydride, terephthalic acid, isophthalic acid, dimethylphthalate, etc.; (h) aromatic diamines such as benzidine, 4,4'-methylenediamine, bis(4-aminophenyl)ether, etc.; (i) bisphenols such as bisphenol A, bisphenol C, bisphenol F, phenolphthalein, recorcinol, etc., (j) bisphenol bis(chloroformates) such as bisphenol A bis(chloroformate), 4,4'-dihydroxybenzophenone bis(chloroformate) etc.; (k) carbonyl and thiocarbonyl compounds such as formaldehyde, acetaldehyde, thioacetone acetone, etc.; (l) phenol and derivatives of phenol, such as, alkylphenols, etc.; (m) polyfunctional cross-linking agents such as tri- or poly basic acids such as trimellitic acid, tri- or polyols such as glycerol, tri- or polyamines such as diethylenetriamine; and other condensation monomers and mixtures of the foregoing.

Preferred polymers formed from the monomers described above include the following commercially available polymers; polyethylene glycol PEG 400, PEG 4000 and 6000 (Fisher Scientific), phenolic resin 3435, 3446 (Polyrez Co., Inc.), linear, cyclic or crosslinked silicone polymers such as SC-102 or SC-114 (Thermoset Plastics, Inc.) or DF-104, SR-107 and DF-1040 (General Electric Co.), acrylic emulsion polymers or copolymers such as AMSCO Res 200, 210, 807 and 1170 (American Mineral Spirits Co.).

More than one polymer may also be used. Their application may be simultaneous or sequential.

A minimum molecular weight for an organic polymeric impregnant in this invention would be on the order of about 400, as determined by vapor phase osmometry. The inorganic polymer impregnant may have a molecular weight of less than 400. Preferably, the polymeric impregnant will have a molecular weight of from about 1000 to 1,000,000, as determined by light scattering. Most preferably, the polymeric impregnant will have a molecular weight of from about 4,000 to 250,000, as determined by light scattering. Vapor phase osmometry and light scattering are well-known methods of measuring molecular weights and are discussed, for example, in Billmeyer, Jr., Fred W., *Textbook of Polymer Science*, 2nd Edition, Wiley-Interscience, New York (1971), pages 67-68 and 81-84.

Any technique may be employed for impregnating the carbonaceous substrate with the polymer. For example, the polymer may be dissolved in a suitable solvent, admixed with the substrate, the excess solution decanted or filtered off, and the substrate dried or heat treated such that the macropores become blocked by a polymer coating. Other techniques include spraying of polymeric solutions or passing vapor of polymer through a sample of the substrate. If the substrate is not adequately impregnated with a single polymer treatment, one or more additional treatments may be employed to achieve the desired macropore blockage.

Preferred carbonaceous substrates in the present invention are materials with a high percentage, most preferably at least 90 percent, of micropores, more particularly those with a high percentage of micropores having an Angstrom size of less than 20. Many of these substrates are available commercially from numerous suppliers or may be produced by any of the methods available to the skilled artisan.

Specifically preferred carbonaceous substrates include activated carbons and carbon molecular sieves.

Typical heating means used in the production of carbonaceous substrates having a high percentage of micropores include indirectly fired rotary kilns, multiple hearth furnaces, fluid bed furnaces, the Selas type indirectly fired or electrically heated screw conveyor kiln or some of the various types of metal treating furnaces (e.g., Lindberg) known in the art. A preferred heating means is an infrared heated continuous transport type furnace described in U.S. Pat. Nos. 4,050,900 and 3,648,630 which are herein incorporated by reference.

Thermal treatment in order to prepare a carbonaceous substrate having a high percentage of micropores (before impregnation) is generally carried out at temperatures in excess of 250° C., with from 500°-1100° C. as a preferred range. Typical residence times are from 1 minute to several hours.

Continuous transport type heating of a carbonaceous substrate to produce carbonaceous materials having a high percentage of micropores for subsequent impregnation may be accomplished in either of two ways. (1) A charred base material may be processed in a furnace atmosphere of low, preferably less than 1000 ppm, oxygen under either a co-current or countercurrent inert gas flow as follows:

|     |                         | Range            | Preferred         |
| --- | ----------------------- | ---------------- | ----------------- |
| (A) | temperature             | 480° to 1100° C. | 750° to 1040° C.  |
| (B) | residence time          | 5 to 90 min.     | 5 to 30 min.      |
| (C) | feed rate               | 15 to 60 lb/hr   | 30 to 50 lb/hr    |
| (D) | N₂ purge rate           | 15 to 35 SCFM    | 20 to 30 SCFM     |

(2) Alternatively, an agglomerated base material may be processed in a furnace atmosphere of low, for example up to 10,000 ppm, oxygen, under a co-current or counter current inert gas flow as follows:

|     |                | Range             | Preferred                              |
| --- | -------------- | ----------------- | -------------------------------------- |
| (A) | temperature    | 250° to 1100° C.  | 500° to 1000° C.                       |
| (B) | residence time | at least 1 min    | 1 to 180 min (most pref 10 to 60 min)  |
| (C) | feed rate      | 1 to 90 lb/hr     | 40 to 55 lb/hr                         |
| (D) | nitrogen purge | 5 to 40 SCFM      | 5 to 30 SCFM                           |

The above parameters will vary depending on the furnace used, and are, therefore, not critical parameters. Agglomerated base materials may contain 30–98 weight percent base material, 1 to 40 weight percent thermal binder, such as coal tar pitch, petroleum pitch, asphalt, bitumin and lignin, from 0 to 20 percent by weight of a cold binder such as starch and from 0 to 40 weight percent water.

The polymeric impregnated sieve may be further modified by charring the polymeric impregnant at 250° to 1100° C., preferably 500° to 1000° C.

The following examples demonstrate the effect of polymeric impregnants on carbonaceous substrates.

These examples are merely illustrative in nature and are not intended as limitations on the scope of the present invention.

EXAMPLE 1

Step 1.—Substrate Preparation

Sized coconut char (8×30 mesh) was thermally treated in a continuous transport type furnace (manufactured by Shirco, Inc.) at 750° C. for 15 min. under nitrogen to produce a carbonaceous substrate. The untreated coconut based substrate had an oxygen/nitrogen selectivity ratio of 0.88, an oxygen capacity of 2.90 cc/cc, and an apparent density of 0.624 g/cc.

Step 2.—Substrate Impregnations 100 g of the coconut based carbon molecular substrate from Step 1 was impregnated with a solution of 2 g of Polyethylene Glycol (PEG) 4000, having a molecular weight of 4000, (Fisher Scientific Co.) in 100 g of water by stirring the substrate with the solution until the char had degassed. (Frothing stopped in about 5-10 min.) Excess solution was decanted from the mixture and the impregnated substrate was air dried for 2-3 hours until free flowing. Subsequently, the impregnated coconut substrate was oven dried at 75° C. for 20 hours to an apparent density of 0.679 g/cc. The final impregnant level of hydrated PEG was calculated from the apparent density change to be 8.8 weight percent. The actual level of PEG would be less than 2.0 weight percent.

Step 3.—Sieve Analysis

To calculate a test gas diffusivity value, the dead volume of a sample cell containing about 10 grams of sieve was determined by helium expansion. Subsequently the test gas was expanded into the reevacuated sample cell from a one liter reference cell. Knowing the dead volume, adsorption (loading) of the test gas was monitored by the change in pressure of the system. These values combined with an equilibrium loading value calculated for a sieve sample after one hour allowed the determination of a relative loading value ($L_t/L_e$). $L_t$ was the test gas loading value of a sieve sample at a given time, for example 30 seconds, and $L_e$ was the test gas loading value of a sieve sample at equilibrium. The diffusivity value (D) of a sieve sample was then calculated for the test gas by solving the simplified equation for diffusion into a sphere:

$$L_t/L_e = 6(Dt/\pi R_0^2)^{\frac{1}{2}} - 3Dt/R_0^2$$

where $L_t$=test gas loading at time, t=30 seconds
$L_e$=equilibrium loading (usually at t=1 hour
D=diffusivity value
t=30 seconds
$R_0$=0.05125 cm (the mean particle radius of a reference adsorbent)

The diffusivity value thusly calculated represents a composite of both the micropores and macropores diffusivity. See: Dedrick, R. L. and Beckmann, R. B., "Kinetics of Adsorption by Activated Carbon from Dilute Aqueous Solution," *Physical Adsorption Processes and Principles*, L. N. Canjar and J. A. Kostecki, eds., Vol. 63, American Institute of Chemical Engineers, New York (1967); Walker, P. L., Jr., Austin, L. G., Nandi, S. P., "Activated Diffusion of Gases in Molecular Sieve Materials", *The Chemistry and Physics of Carbon*, P. L. Walker, Jr., ed., Vol. 2, Marcel Dekker, Inc., New York (1966) and Crank, J., "The Mathematics of Diffusion", 2nd Ed., Clarendon Press, Oxford (1975).

Diffusivity values for this and all subsequent examples were determined using a starting gas pressure of one atmosphere ±5 percent at a temperature of 25° C.±5° C. The time, t, used in these determinations was 30 seconds. Determination of test gas diffusivity values allowed for calculation of the selectivity ratio (e.g. oxygen/nitrogen $S = DO_2/DN_2$). The capacity of the sieve was determined by expressing the equilibrium loading, $L_e$, as a gas volume (STP) per cubic centimeter of adsorbent.

Analysis of the impregnated sieve showed an oxygen/nitrogen selectivity ratio of 43.3 and an oxygen capacity of 3.04 cc/cc.

EXAMPLE 2

Step 1.—Substrate Preparation

A mixture containing 80 parts by weight pulverized coconut char, 10 parts coal tar pitch (105° C. softening point), 10 parts pulverized starch, and 20-25 percent water was pelletized in a pellet mill to form ⅛"×⅜" pellets. The pellets were then thermally treated under nitrogen at 800° C. for 15 min. in a continuous transport type furnace to produce a carbonaceous substrate. Gas diffusivity values for this sieve were calculated as described in Example 1, Step 3. The carbonaceous substrate had an apparent density of 0.50 g/cc, an oxygen/nitrogen selectivity ratio of 3.00, and an oxygen capacity of 3.12 cc/cc.

Step 2.—Substrate Impregnation

100 Grams of the carbonaceous substrate described above in Step 1 were impregnated as in Example 1, Step 2, with a solution containing 1 g of PEG 4000 in 100 g of water. Excess solution was decanted, the substrate was towelled dry, then subsequently dried at 150° C. until the apparent density was 0.530 g/cc. Gas diffusivity values for this substrate were calculated as described in Example 1, Step 3. The impregnated substrate had an oxygen/nitrogen selectivity ratio of 61.3, and an oxygen capacity of 3.09 cc/cc. The final impregnant level of hydrated PEG was calculated from the apparent density change to be 6.0 weight percent. The actual level of PEG would be less than 5.0 weight percent.

EXAMPLE 3

100 Grams of the untreated carbonaceous substrate described in Example 2, Step 1, were impregnated with a solution of 5 g of PEG 4000, having a molecular weight of 4000, in 100 g of water then dried as in Example 2 to yield an impregnated substrate having an apparent density of 0.540 g/cc, an oxygen/nitrogen selectivity ratio of 102.6, and oxygen capacity of 3.04 cc/cc. The final impregnant level of hydrated PEG was calculated from the apparent density change to be 8.0 weight percent. The actual level of PEG would be less than 5.0 weight percent.

EXAMPLE 4

100 Grams of the untreated carbonaceous substrate described in Example 2, Step 1, were impregnated with a solution containing 5 g of PEG 6000, having a molecular weight of 6000, (Fisher Sicentific Co.), in 100 g of water then dried as described in Example 2 to yield an impregnated sieve having an apparent density of 0.530 g/cc, an oxygen/nitrogen selectivity ratio of 47.5, and an oxygen capacity of 3.22 cc/cc. The final impregnant level of hydrated PEG was calculated from the apparent density change to be 6.0 weight percent. The actual level of PEG would be less than 5.0 weight percent.

EXAMPLE 5

100 Grams of the untreated carbonaceous substrate described in Example 2, Step 1, were impregnated with a solution containing 1 cc of Polyrez 3446 phenol formaldehyde resin in 100 cc of water, towelled dry, and dried at 115° C. for 16 hours to remove the water and set the resin. The impregnated sieve had an apparent density of 0.521 g/cc, an oxygen/nitrogen selectivity ratio of 24.7, and an oxygen capacity of 3.14 cc/cc. The final impregnant level, plus moisture, was calculated from the apparent density change to be 4.2 weight percent. The actual level of Polyrez 3446 would be less than 2.0 weight percent.

EXAMPLES 6-61

Carbon molecular sieves were prepared by immersing various substrates in various polymer solutions as indicated in Table I. The solutions were decanted from the solids. The treated substrates were then air dried and placed on a blotter to remove excess polymer solution. Further drying was accomplished by drying the treated substrates in a drying oven at 100° C. for 12 hours. The final impregnation level of impregnant, in grams per gram substrate, were determined by the difference in apparent density between a non-impregnated sample of the substrate and the impregnated substrate. The error limit in this determination was ±5 percent. The impregnation levels are difficult to obtain and are only approximate, as is evidenced by the fact that some of the measurements resulted in negative levels, which is impossible. The oxygen diffusivity, ($DO_2$), oxygen/nitrogen selectivity, $DO_2/DN_2$, (S), and oxygen capacity ($O_2$ CAP), were determined for the impregnated substrate and a non-impregnated sample of the substrate. The results are summarized in Table I.

The sieve of Example 24 was prepared by heating a mixture of calcinated coconut char and 5 weight percent sulfur powder in an oven at 150° C. until the sulfur was adsorbed.

The sieves of Examples 58 through 61 were subsequently heated to 370° C. for fifteen minutes to char the polymer impregnant. The $DO_2$, S and $O_2$ cap reported in Table I, for Examples 58 through 61, were for the charred polymers.

TABLE 1

| Example | Substrate | g | Polymer | g | Solvent | g | Final Impregnation Level (g/g) | $DO_2$ ($\times 10^{-8}$ cu$^2$/sec) | S | $D_2$ CAF (cc/cc) |
|---|---|---|---|---|---|---|---|---|---|---|
| 6 | 3 × 6 mesh coconut char | — | | | | | | 1934 | 1.18 | 2.24 |
| 7 | 3 × 6 mesh coconut char | 50 | POLYREZ 3446[g] | 2 | water | 100 | 0.11 | 579 | 6.1 | 2.3 |
| 8 | 3 × 6 mesh coconut char | 50 | AMSCO 1170[h] | 10 | water | 100 | 0.01 | 697 | 4.6 | 2.15 |
| 9 | 3 × 6 mesh coconut char | 50 | UCAR 4580[i] | 10 | water | 100 | — | 1443 | 3.8 | 1.94 |
| 10 | 3 × 6 mesh coconut char | 50 | PEC 400[j] | 10 | water | 100 | 0.18 | 9 | 11.5 | 1.35 |
| 11 | 3 × 6 mesh coconut char | 20 | DF 104[k] | 10 | Acetone | 40 | 0.13 | 4.3 | 23.5 | 0.77 |
| 12 | 3 × 6 mesh coconut char | 20 | SR 141[l] | 10 | Acetone | 40 | 0.09 | 25 | 132 | 0.66 |
| 13 | 3 × 6 mesh coconut char | 50 | AE (K-1-S)[m] | 15 | water | 100 | 0.18 | 176 | 70 | 2.25 |
| 14 | 3 × 6 mesh coconut char | 50 | AE (K-1-M)[n] | 15 | water | 100 | 0.15 | 11.2 | 8.3 | 1.83 |
| 15 | 3 × 6 mesh coconut char | 50 | POLYREZ 3435[o] | 2 | Acetone | 40 | 0.04 | 279 | 94 | 1.17 |
| 16 | 3 × 6 mesh coconut char | 50 | AMSCO 1170 | 10 | water | 100 | 0.08 | 729 | 7 | 1.71 |
| 17 | Calgon MSC-V[a] | — | | | | | | 2334 | 0.9 | 4.6 |
| 18 | Calgon MSC-V | 50 | PEG 400 | 10 | water | 100 | 0.10 | 2409 | 2.7 | 3.02 |
| 19 | Calgon MSC-V | 20 | POLYREZ 3435 | 20 | water | 50 | 0.10 | 172 | 252 | 2.05 |
| 20 | Calgon MSC-V | 50 | UCAR351[p] | 20 | water | 100 | 0.01 | 2787 | 1.7 | 3.21 |
| 21 | Calgon MSC-V | 50 | AMSCO 1170 | 20 | water | 100 | 0.10 | 1640 | 4 | 3.96 |
| 22 | Calgon MSC-V | 20 | UCAR 4580 | 20 | water | 100 | 0.20 | 2787 | 1.9 | 3.6 |
| 23 | Granular Coconut Char[b] | — | | | | | | 572 | 9.6 | 4.5 |
| 24 | Granular Coconut Char | | Sulfur | 5% | — | | 0.5 | 92.9 | 931 | 4.47 |
| 25 | Calgon PCB[c] | — | | | | | | 2000 | 0.82 | 3.1 |
| 26 | Calgon PCB | 15 | DMDAAC 65%[q] | 2 | water | 50 | 0.07 | 2471 | 1.57 | 2.96 |
| 27 | Calgon PCB | 15 | PEG 20,000[r] | 2 | water | 100 | 0.02 | 2786 | 1 | 3.19 |
| 28 | Calgon PCB | 20 | UCAR 4580 | 10 | water | 100 | — | 2437 | 1.53 | 3.35 |
| 29 | Calgon PCB | 50 | AMSCO 1170 | 20 | water | 100 | — | 2316 | 1.6 | 2.75 |
| 30 | Calgon PCB | 50 | UCAR 351 | 20 | water | 100 | — | 2471 | 1.74 | 2.79 |
| 31 | Calgon PCB | 50 | PEG 400 | 10 | water | 0.15 | 1802 | 1.05 | 1.22 | |
| 32 | Calgon PCB | 50 | POLYREZ 3446 | 5 | water | 100 | 0.01 | 1984 | 1.35 | 2.36 |
| 33 | Calgon PCB | 50 | POLYREZ 3435 | 2 | Acetone | 50 | 0.06 | 1985 | 1.26 | 2.37 |
| 34 | Calgon PCB | 20 | DF 104 | 10 | Acetone | 40 | 0.19 | 1707 | 0.94 | 1.03 |
| 35 | Calgon PCB | 20 | SR 141 | 10 | Acetone | 40 | 0.50 | 1707 | 1.95 | 1.41 |
| 36 | Calgon PCB | 50 | AE (K-1-S) | 20 | water | 100 | — | 1486 | 0.54 | 2.99 |
| 37 | Calgon PCB | 50 | AE (K-1-M) | 20 | water | 100 | 0.04 | 280 | 1.10 | 2.0 |
| 38 | Bituminous Coal Agglomerate[d] | — | | | | | | 1150 | 0.74 | 1.07 |

TABLE 1-continued

| Example | Substrate | g | Polymer | g | Solvent | g | Final Impregnation Level (g/g) | DO$_2$ ($\times 10^{-8}$ cu$^2$/sec) | S | D$_2$ CAF (cc/cc) |
|---|---|---|---|---|---|---|---|---|---|---|
| 39 | Bituminous Coal Agglomerate | 50 | AMSCO 1170 | 20 | water | 100 | 0.01 | 1975 | 3.66 | 0.978 |
| 40 | Bituminous Coal Agglomerate | 50 | UCAR 4580 | 20 | water | 100 | 0.07 | 1111 | 1.33 | 0.856 |
| 41 | Bituminous Coal Agglomerate | 50 | PEG 400 | 10 | water | 100 | 0.15 | 2340 | 46.8 | 0.711 |
| 42 | Bituminous Coal Agglomerate | 50 | DF 104 | 10 | Acetone | 40 | 0.09 | 15.6 | 2010 | 0.409 |
| 43 | Bituminous Coal Agglomerate | 20 | SR 141 | 10 | Acetone | 40 | 0.05 | 217 | 46 | 0.320 |
| 44 | Bituminous Coal Agglomerate | 50 | AE (K-l-S) | 15 | water | 100 | 0.08 | 1512 | 5.5 | 1.01 |
| 45 | Bituminous Coal Agglomerate | 50 | AE (K-l-M) | 15 | water | 100 | 0.01 | 326 | 49 | 0.28 |
| 46 | Bituminous Coal Agglomerate | 50 | POLYREZ 3446 | 2 | water | 100 | 0.04 | 2350 | 4.3 | 1.00 |
| 47 | Bituminous Coal Agglomerate | 20 | POLYREZ 3435 | 2 | Acetone | 40 | 0.10 | 1580 | 10.4 | 0.80 |
| 48 | Bituminous Coal Agglomerate | 20 | UCAR 4580 | 10 | water | 100 | 0.03 | 2220 | 3.1 | 1.10 |
| 49 | Calcinated Bituminous Coal Agglomerate[e] | — | | | | | | 1471 | 1.47 | 4.43 |
| 50 | Calcinated Bituminous Coal Agglomerate | 10 | PEG 4000[s] | 1 | water | 50 | — | 770 | 38.6 | 4.0 |
| 51 | Calcinated Bituminous Coal Agglomerate | 10 | PEG 20,000 | 1 | water | 50 | — | 950 | 18.9 | 4.2 |
| 52 | Calcinated Bituminous Coal Agglomerate | 10 | POLYREZ 3446 | 0.5 | water | 50 | 0.066 | 61 | 16,900 | 0.16 |
| 53 | 12 × 20 Lignite Char | — | | | | | | 609 | 2.49 | 2.38 |
| 54 | 12 × 20 Lignite Char | 20 | POLYREZ 3446 | 2 | water | 100 | 0.01 | 191 | 21.3 | 1.57 |
| 55 | Agglomerated Coconut Char[f] | — | | | | | | 1082 | 3.0 | 3.12 |
| 56 | Agglomerated Coconut Char | 20 | Meta Silicate[t] | 10 | water | 50 | 0.09 | 767 | 6 | 2.69 |
| 57 | Agglomerated Coconut Char | 20 | Meta Silicate | 10 | water | 50 | 0.02 | 1469 | 8.2 | 2.79 |
| 58 | Agglomerated Coconut Char | 20 | POLYREZ 3435 | 2 | Acetone | 40 | 0.07 | 1324 | 17.4 | 2.85 |
| 59 | Agglomerated Coconut Char | 20 | POLYREZ 3435 | 5 | Acetone | 40 | 0.17 | 24.5 | 3.00 | |
| 60 | Agglomerated Coconut Char | 50 | POLYREZ 3446 | 2 | water | 100 | 0.05 | 1536 | 7.4 | 3.06 |
| 61 | Agglomerated Coconut Char | 50 | POLYREZ 3446 | 5 | water | 100 | 0.08 | 1455 | 9.2 | 2.97 |

The following definitions will be useful in the interpretation of the data in Table I:

(a) Calgon MSC-V—molecular sieve carbon, available from Calgon Carbon Corporation, Pittsburgh, Pa.

(b) Granular Coconut Char—12×40 mesh granular coconut char calcined at 1000° C.

(c) Calgon PCB—3×6 mesh granules of coconut char activated for several hours at 982° C. with steam, available from Calgon Carbon Corporation, Pittsburgh, Pa.

(d) Bituminous Coal Agglomerate—12×40 mesh granules of agglomerated blend of 93 percent medium volitile bituminous coking coal and 7 percent coal tar pitch (105°) oxidized and devolitilized by heating to 450° C. in air. An activated carbon precursor.

(e) Calcinated Bituminous Coal Agglomerate—12×40 feed calcinated in an inert atmosphere at 760° to 982° C. for several hours.

(f) Agglomerated Coconut Char—calcinated ⅛-inch pellets of agglomerated coconut char composed of 10 weight percent starch, 10 weight percent pitch (105° C.) and 80 weight percent coconut char, calcinated at 800° C. for 30 minutes, apparent density 0.500 g/cc.

(g) POLYREZ 3446—a water-soluble phenolic resin, available from POLYREZ Co.

(h) AMSCO 1170—a vinyl acetate emulsion polymer, 45 percent solids content, 200 cps viscosity, 33° C. glass transition temperature, available from Union Oil Co.

(i) UCAR 4580—an acrylic emulsion polymer, 48 percent solids content, available from Union Carbide.

(j) PEG 400—a polyethylene glycol, having a molecular weight of 400, available from Fisher Scientific.

(k) DF 104—a water-insoluble silicone solution, available from General Electric.

(l) SR 141—a water-insoluble silicone solution, available from General Electric.

(m) A.E. (K-1-S)—an asphalt emulsion with a slow cure rate, available from Koppers Co.
(n) A.E. (K-1-M)—an asphalt emulsion with a medium cure rate, available from Koppers Co.
(o) POLYREZ 3435—a water-insoluble phenolic resin (higher molecular weight than POLYREZ 3446), available from POLYREZ Co.
(p) UCAR 351—a vinyl acrylic latex emulsion polymer, 0.3 micron particle size, 65 percent solids content, 10° C., glass transition temperature, available from Union Carbide.
(q) DMDAAC 65 Percent—Dimethyl diallyl ammonium chloride polymer, available from Calgon Carbon Corporation, Pittsburgh, Pa.
(r) PEG 20,000—a polyethylene glycol, having a molecular weight of 20,000, available from Fisher Scientific.
(s) PEG 4000—a polyethylene glycol, having a molecular weight of 4000, available from Fisher Scientific.
(t) Meta Silicate—sodium meta-silicate available from Fisher Scientific Co., used 10 g sodium meta-silicate in 50 g water.

EXAMPLE 62

The molecular sieve of Example 21 was tested for the adsorption of various gases, as described in Example 1, Step 3.
The results were as follows:

|  | Diffusivity ($\times 10^{-8}$ cm$^2$/sec) | Capacity (cc/cc) |
| --- | --- | --- |
| $CO_2$ | 714 | 24.2 |
| $CH_4$ | 14 | 11.6 |
| $C_2H_4$ | 71 | 22.6 |
| $C_2H_6$ | 1.0 | 16.1 |

Selectivity values for selected separations were:

| | |
| --- | --- |
| $CO_2/CH_4$ | 51 |
| $C_2H_4/C_2H_6$ | 71 |
| $CH_4/C_2H_6$ | 14 |
| $CO_2/C_2H_6$ | 714 |

EXAMPLE 63

The molecular sieve of Example 48 was tested for the adsorption of various gases, as described in Example 1, Step 3.
The results were as follows:

|  | Diffusivity ($\times 10^{-8}$ cm$^2$/sec) | Capacity (cc/cc) |
| --- | --- | --- |
| $CO_2$ | 950 | 9.3 |
| $CH_4$ | 443 | 2.3 |
| $C_2H_4$ | 373 | 8.5 |
| $C_2H_6$ | 100 | 6.9 |
| $C_3H_6$ | 111 | 10.4 |
| $C_3H_8$ | 2.5 | 3.8 |
| $n-C_4H_{10}$ | 2 | 2.7 |

Selectivity values for selected separations were:

| | |
| --- | --- |
| $CO_2/CH_4$ | 2.1 |
| $C_2H_4/C_2H_6$ | 3.7 |
| $C_3H_6/C_3H_8$ | 44.4 |
| $CH_4/n-C_4H_{10}$ | 221.5 |

EXAMPLE 64

50 g of the untreated carbonaceous substrate, described in Example 2, Step 1, were impregnated with a solution of 15 g of DF 1040 in 50 g of cyclohexane. DF 1040 is a water-insoluble silicone solution available from General Electric. The impregnated substrate was dried at 110° C. to an apparent density of 0.563 g/cc. Gas diffusivity values for this carbon molecular sieve were calculated, as described in Example 1, Step 3.
The results were as follows:

|  | Diffusivity ($\times 10^{-8}$ cm$^2$/sec) | Capacity (cc/cc) |
| --- | --- | --- |
| $O_2$ | 866 | 3.15 |
| $N_2$ | 28 | 3.02 |
| $CO_2$ | 392 | 17.7 |
| $CH_4$ | 0.01 | 4.6 |
| $C_2H_4$ | 0.4 | 12.4 |
| $C_2H_6$ | 0.3 | 0.6 |
| $C_3H_8$ | nil | nil |
| $n-C_4H_{10}$ | nil | nil |

Selectivity values for selected separations were:

| | |
| --- | --- |
| $O_2/N_2$ | 30.9 |
| $CO_2/CH_4$ | 39,200 |
| $CO_2/C_2H_4$ | 980 |

What is claimed is:
1. A process for separating gas mixtures containing components of at least two different molecular diameters, molecular weights or molecular shapes, comprising passing gas through a molecular sieve comprising a carbonaceous substrate selected from the group consisting of molecular sieve carbon; calcined char and calcined agglomerated char selected from the group consisting of coconut, peach pits, walnut shells, babassu nut shells, and cherry pits; oxidized and devolatilized agglomerated coal; and calcined agglomerated coal; impregnated with an organic polymer having a molecular weight of at least 400, as determined by vapor phase osmometry, or with an inorganic polymer at a dosage of at least 0.001 weight percent (based on the substrate weight) up to a maximum dosage which still allows the resulting sieve to separate gas mixtures containing components of at least two different molecular diameters, molecular weights or molecular shapes.
2. The process of claim 1, wherein said carbonaceous substrate is a molecular sieve carbon.
3. The process of claim 1, wherein said carbonaceous substrate is calcined char selected from the group consisting of coconut shells, peach pits, walnut shells, babassu nut shells and cherry pits.
4. The process of claim 1, wherein said carbonaceous substrate is calcined agglomerated char selected from the group consisting of coconut shells, peach pits, walnut shells, babassu nut shells and cherry pits.
5. The process of claim 1, wherein said carbonaceous substrate is oxidized and devolatilized agglomerated coal.
6. The process of claim 1, wherein said carbonaceous substrate is calcined agglomerated coal.

7. The process of claim 1, wherein said gas mixture is oxygen and nitrogen.

8. The process of claim 1, wherein said gas mixture is carbon dioxide and methane.

9. The process of claim 1, wherein said gas mixture is ethylene and ethane.

10. The process of claim 1, wherein said gas mixture is methane and ethane.

11. The process of claim 1, wherein said gas mixture is carbon dioxide and ethane.

12. The process of claim 1, wherein said gas mixture is propylene and propane.

13. The process of claim 1, wherein said gas mixture is methane and butane.

14. The process of claim 1, wherein said gas mixture is carbon dioxide and ethylene.

* * * * *